United States Patent
Fruhwirth et al.

(10) Patent No.: US 7,559,259 B2
(45) Date of Patent: Jul. 14, 2009

(54) METHOD FOR DETERMINING TORQUE USING A ROTARY POSITION SIGNAL AND AN OFFSET VALUE

(75) Inventors: Gerhard Josef Fruhwirth, Schonau (AT); Thomas Karer, Wolfern (AT)

(73) Assignee: Engineering Center Steyr GmbH & Co. KG, St. Valentin (AT)

( * ) Notice: Subject to any disclaimer, the term of this patent is extended or adjusted under 35 U.S.C. 154(b) by 98 days.

(21) Appl. No.: 11/818,261

(22) Filed: Jun. 13, 2007

(65) Prior Publication Data
US 2008/0011103 A1    Jan. 17, 2008

(30) Foreign Application Priority Data
Jun. 16, 2006  (DE) .................. 10 2006 027 834

(51) Int. Cl.
*G01L 3/14* (2006.01)
(52) U.S. Cl. ................................. 73/862.321
(58) Field of Classification Search ............. 73/862.29, 73/862.321, 862.325
See application file for complete search history.

(56) References Cited

U.S. PATENT DOCUMENTS

| | | | |
|---|---|---|---|
| 4,520,681 A | | 6/1985 | Moore et al. |
| 5,253,531 A | * | 10/1993 | Walker et al. .................. 73/650 |
| 5,265,480 A | * | 11/1993 | Tsuji et al. ............. 73/862.325 |
| 5,438,882 A | * | 8/1995 | Karim-Panahi et al. 73/862.324 |
| 5,449,900 A | * | 9/1995 | Halliwell ............... 250/231.13 |
| 5,456,641 A | * | 10/1995 | Sawase ......................... 475/86 |
| 5,471,390 A | * | 11/1995 | Sasaki .......................... 701/78 |
| 5,508,923 A | * | 4/1996 | Ibamoto et al. ................ 701/70 |
| 5,754,967 A | * | 5/1998 | Inoue et al. .................... 701/54 |
| 5,918,286 A | * | 6/1999 | Smith et al. ............ 73/862.324 |
| 6,634,451 B2 | * | 10/2003 | Sakakiyama ................ 180/197 |
| 6,901,815 B2 | | 6/2005 | Torre |
| 7,223,203 B2 | * | 5/2007 | Yamazaki et al. ............. 477/15 |
| 7,274,985 B2 | * | 9/2007 | Nagaya et al. ................ 701/82 |

FOREIGN PATENT DOCUMENTS

| | | |
|---|---|---|
| DE | 4038413 A1 | 6/1992 |
| DE | 4320834 A1 | 4/1994 |
| DE | 1954099 A1 | 7/1996 |
| DE | 10324016 A1 | 12/2003 |
| DE | 102004019379 | 11/2005 |

* cited by examiner

*Primary Examiner*—Lisa M Caputo
*Assistant Examiner*—Freddie Kirkland, III
(74) *Attorney, Agent, or Firm*—Harness, Dickey & Pierce, P.L.C.

(57) ABSTRACT

A method is provided for the determination of a torque which is transmitted along a torque transmission path which extends at least along a shaft of a motor vehicle. A rotary position signal is produced by a first speed of rotation sensor at a first section of the transmission path and a rotary position signal is produced by a second speed of rotation sensor at a second section of the transmission path. At a point in time at which a known torque is transmitted along the transmission path, a first rotary position signal relationship is determined with reference to the instantaneously generated rotary position signals, the rotary position signal relationship serving as an offset value. At a later point in time, a second rotary position signal relationship is determined with reference to the instantaneously generated rotary position signals. The transmitted torque is calculated on the basis of the offset value and of the second determined rotary position signal relationship.

18 Claims, 4 Drawing Sheets

METHOD FOR DETERMINING TORQUE USING A ROTARY POSITION SIGNAL AND AN OFFSET VALUE

FIELD

The present invention relates to a method for determining a torque which is transmitted along a torque transmission path in a drive train of a motor vehicle.

BACKGROUND

The statements in this section merely provide background information related to the present disclosure and may not constitute prior art.

It is known to determine torque changes of rotating shafts with reference to the twisting (torsion) of the shaft. For example, a respective encoder wheel can with speed of rotation sensors can be mounted to a shaft at both ends to determine the torsion of the ends relative to one another. The relative torsion produces a direct relationship with the torque transmitted by the shaft.

In such a process, however, it is not possible to obtain absolute torque values. Only relative torque changes are in particular obtained by measurement of the relative torsion or twisting. A further disadvantage of the known torque determination methods lies in the fact that a mechanical play contained in the observed torque transmission path can incorrectly be interpreted as a transmitted torque.

SUMMARY

It is the underlying object of the invention to provide a method which permits a more precise determination of a transmitted torque on the basis of rotary position signals.

This object is satisfied by a method having the features of claim 1.

The invention provides a method for the determination of a torque which is transmitted along a torque transmission path which extends along at least a part of a shaft of a motor vehicle. A rotary position signal is produced by means of a first speed of rotation sensor arranged at a first section of the transmission path and a further rotary position signal is produced by means of at least one second speed of rotation sensor arranged at a second section of the transmission path. At a point in time at which a known torque is transmitted along the transmission path, a first rotary position signal relationship is determined, which will be termed an offset value in the following, with reference to the instantaneously generated rotary position signals of the speed of rotation sensor. At a later point in time, a second rotary position signal relationship is determined with reference to the instantaneously generated rotary position signals, with the torque transmitted at this point in time being calculated on the basis of at least the offset value and the second determined rotary position signal relationship.

The determination of the torque transmitted at a specific point in time thus takes place at least with reference to the named offset value (that is with reference to the first rotary position signal relationship for a known torque transmitted at an earlier point in time) and with reference to the second (current) rotary position signal relationship. An absolute value of the transmitted torque can be calculated at a later point in time by taking account of the offset value. Sections in the drive train having play can also be taken into account, as will be explained in the following.

A particular advantage of the method also lies in the fact that the required rotary position signals can be provided partly or even completely by speed of rotation sensors which are anyway present in the vehicle, for example in connection with a brake force control (anti-lock brake system, ABS) or a dynamic driving control (e.g. electronic stability program, ESP).

The typically pulse-like signal of a known speed of rotation sensor, for example, can serve as a rotary position signal in which the time interval between two sequential signal pulses or a pulse rate corresponds to an angle of rotation covered or to a speed. A predetermined relationship between the respective rotary position signals of a plurality of speed of rotation sensors, for example a difference or a quotient of the rotary position signals or of averaged rotary position signals is to be understood as a rotary signal relationship in connection with the invention. The respective rotary position signals at least form a data set of values which are directly or indirectly offset against one another.

Advantageous embodiments of the invention are described in the description, in the Figures and in the dependent claims.

In order to take account of parts in the drive train subject to play (e.g. transmission, hinged connections effective for rotation), in an advantageous embodiment of the invention, a respective rotary position signal relationship is determined for a plurality of points in time with respect to the respectively produced rotary position signals at the latest before the named determination of the second rotary position signal relationship. In this connection, a specific play value is determined for the observed transmission path in that the maximum difference is determined between the rotary position signal relationships determined for the plurality of points in time. The torque instantaneously transmitted (at a later time) is in this case calculated on the basis of the offset value, of the second determined rotary position signal relationship and of the play value. The transmitted torque is in particular calculated by subtraction of the offset value and of the play value from the second determined relationship of the rotary position signals.

It is generally sufficient to determine the play once for an observed torque transmission path. However, wear phenomena in the drive train can be recognized by a long-term observation of the mechanical play.

In accordance with an advantageous embodiment, the play value is determined by a so-called open long-term observation of loadless states of the transmission path. Alternatively to this, the play value is determined during a single loadless state, in particular on the basis of a load reversal at the transmission path caused by a gear change.

In accordance with a further advantageous embodiment, the named offset value (first rotary position signal relationship) is determined for such a point in time at which it is known that substantially no torque is transmitted along the transmission path (zero transmitted torque) In order also to be able to take account of a possible mechanical play of the different parts of the transmission path with respect to the offset value, it is of advantage for the offset value to be determined at a point in time at which the respective parts of the transmission path contact a play abutment.

The offset value can in particular be determined with reference to rotary position signals which are produced during a point in time at which the observed transmission path is uncoupled from a drive unit of the motor vehicle. For example, the offset is determined during an open thrust operation or during a cornering of an all-wheel drive motor vehicle during which a torque transmission clutch of the vehicle is open.

The offset value is preferably only determined when the travel speed of the vehicle exceeds a predetermined threshold. It is hereby ensured that a corresponding rotary position signal relationship can be determined with sufficient accuracy.

The calculation of the transmitted torque preferably takes place such that a torsion angle is calculated with reference to at least the offset value and the second determined rotary position signal relationship, with this torsion angle being offset against a predetermined stiffness of the transmission path to obtain the transmitted torque. The offset of the torsion angle against the stiffness can take place after or also before a mutual offset of offset values and of a second determined rotary position signal relationship, i.e. the first and second rotary position signal relationships can be offset against a respective stiffness and only thereafter is the sought torque determined from this.

In a further embodiment, only those rotary position signals are taken into account for the determination of the first rotary position signal relationship (offset value) and the second rotary position signal relationship. After an interruption of the measurement operation, the offset value must therefore be determined again. The said first and second rotary position signal relationships are thus determined during a continuous reception of the signals of the speed of rotation sensors.

In accordance with a further development of the invention, the first speed of rotation sensor is connected to a first control unit and the second speed of rotation sensor is connected to a second control unit. The respective reception time point is determined for a large number of communications which are not necessarily in direct connection with the determination of the torque and which are transmitted to the first control unit and to the second control unit via a data bus (e.g. CAN) of the motor vehicle. The respective (actual) clock frequency of the first control unit and of the second control unit is determined by averaging the determined reception time points. The difference between the clock frequency of the first control unit and the clock frequency of the second control unit is determined and the rotary position signal relationships are determined with reference to the measured rotary position signals while additionally taking account of the determined difference in clock frequencies. In the case that the speed of rotation sensors are connected to different control units, these control units are therefore hereby synchronized with one another such that any differences with regard to the respective clock frequency are compensated.

In accordance with another further development of the invention, communications with which the rotary position signals of the speed of rotation sensors are transmitted to a control unit of the motor vehicle via a data bus (e.g. CAN) are provided with an associated transmission time stamp. The rotary position signal relationships are then determined with reference to the measured rotary position signals with additional taking into account of the associated transmission time stamps. In the case that different control units which are not necessarily synchronized with one another are associated with the speed of rotation sensors, a processing of the rotary position signals or of the corresponding communications is hereby also made possible synchronously in time since each piece of signal information is linked to an associated piece of time information.

The following uses are possible, for example, on the basis of the method in accordance with the invention:

(a) The calculated transmitted torque can be compared with a threshold value, with a control command being generated in the case the threshold value is not reached in order to open the torque transmission path and thus to interrupt an acoustic transmission path of the motor vehicle. The method in accordance with the invention therefore proves to be particularly advantageous to reliably recognize an actually loadless state, or an at least substantially loadless state, of the observed torque transmission path. If this is the case, an associated control unit can open a longitudinal transfer case in an all-wheel drive vehicle, for example, in order hereby also to interrupt the acoustic transmission path formed by the torque transmission path. The forming and transmission of noise along the torque transmission path can hereby be effectively avoided.

(b) By a comparison of the calculated transmitted torque with a desired torque value of a torque transmission clutch, the association between the set desired value and the corresponding control parameter of the torque transmission clutch can optionally be corrected. A clutch for the longitudinal transfer of the drive torque in an all-wheel drive vehicle can hereby be calibrated, for example.

(c) In particular with vehicles with a longitudinal engine and rear wheel drive or all-wheel drive, a load reversal can occur when the drive train tightens and relaxes again after a specific time duration. With new vehicles, the characteristics of the load reversal are measured and stored in the engine control device. The load reversal originating from the drive train can thus be damped. When, however, the vehicle ages and the drive train is out of true, this characteristic of the load reversal changes. By measuring the torque which builds up and reduces on the relaxation of the load reversal, it is possible to counter such a load reversal by a corresponding control of the vehicle engine on the basis of the method in accordance with the invention, and indeed independently of an age-induced change in the characteristic. In the same way, a "juddering" of the vehicle can be actively damped by a corresponding control of the vehicle engine since this juddering is ultimately also based on the fact that unwanted torques are generated in the drive train which can be cancelled by an active counteraction by a corresponding change in the drive torque.

(d) The method in accordance with the invention for the determination of the transmitted torque is also advantageously used in automatic transmissions, for example in automated stick transmissions, in transmissions with continuously variable transmission (CVT) or in dual clutch transmissions. In automatic transmissions of this type, the torque transmitted on a shifting process should namely be known as accurately as possible in order to adapt the shifting behavior of the vehicle to a specific expected feeling of the driver (e.g. noticeability of the shift shock). It is also desired, in particular in connection with automated shift transmissions for trucks, to shorten the period of the interruption in tractive force during a shifting process; however, the existing torque must be phased out directly for this purpose. The actually transmitted torque can be used as the basis for the shift behavior (control of the transmission and of the drive torque) based on the method in accordance with the invention.

(e) By measurement of the torques actually transmitted in the drive train by means of the method in accordance with the invention, introduced braking torques can also be determined which result from a driving dynamics regulating intervention which is based on a modulation of the braking pressure (e.g. electronic stability program ESP). Driving dynamics regulation interventions can hereby be controlled better and it can be ensured even more reliably that the vehicle is again oriented in the direction of travel.

(f) The torque measured in the drive train can also be used as the basis for the engine control. Simulation models are usually used for the calculation of the engine torque whose precision, however, depends greatly on the ageing of the engine. The engine torque can be determined accurately and made plausible by conversion of the torque with the (known) gear ratio calculated in accordance with the invention.

(g) The real load of the respective vehicle can be documented, and ultimately read out at a car shop, by constant or regular determination of the torques actually transmitted in the drive train and a corresponding storage of these values in the vehicle. It is hereby not only possible to draw conclusions on wear phenomena in the specific vehicle, but such values can be statistically evaluated for a collective of a plurality of vehicles to adapt the configuration of the drive train to the actual conditions even better.

The invention also relates to a motor vehicle having a torque transmission path which extends along at least a part of a drive train of the vehicle. The vehicle has a control unit which is configured for the determination of a torque transmitted along the transmission path in accordance with a method of the explained type. The vehicle can also be equipped with at least one speed of rotation sensor for this purpose which exclusively serves for the determination of the transmitted torque and is provided in addition to further speed of rotation sensors also present for other functions.

DRAWINGS

The invention will be described in the following only by way of example with reference to the drawings; there are shown in them.

DETAILED DESCRIPTION

Figure 1:
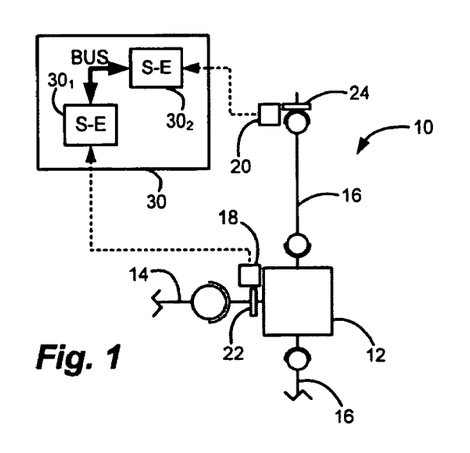
FIG. 1 is a schematic representation of a part of a motor vehicle drive train which transmits a torque determined with the method in accordance with the invention.

FIG. 1 schematically shows a torque transmission path 10 which includes a drive train component 12, an input shaft 14 and at least one output shaft 16. The input shaft 14 transmits a torque to the drive train component 12 which in turn transmits the torque to the output shaft 16. Speed of rotation sensors 18, 20 monitor the rotary angle position or the speed of respective encoder wheels 22, 24 which are connected in a rotationally effective manner to the respective input shaft and output shaft 14, 16 and generate corresponding rotary position signals. The encoder wheels 22, 24 are preferably toothed wheels, with the speed of rotation sensors 18, 20 generating respective pulse signals on the basis of the teeth passing the sensor as is known per se for ABS (anti-lock braking system) speed of rotation sensors. The speed of rotation sensor 20 is preferably an ABS sensor anyway present in the vehicle. A control unit 30 monitors the operation of the transmission path 10 on the basis of the signals of the speed of rotation sensors 18, 20 and determines from this the torque which is transmitted by the shafts 14,16.

Figure 2:
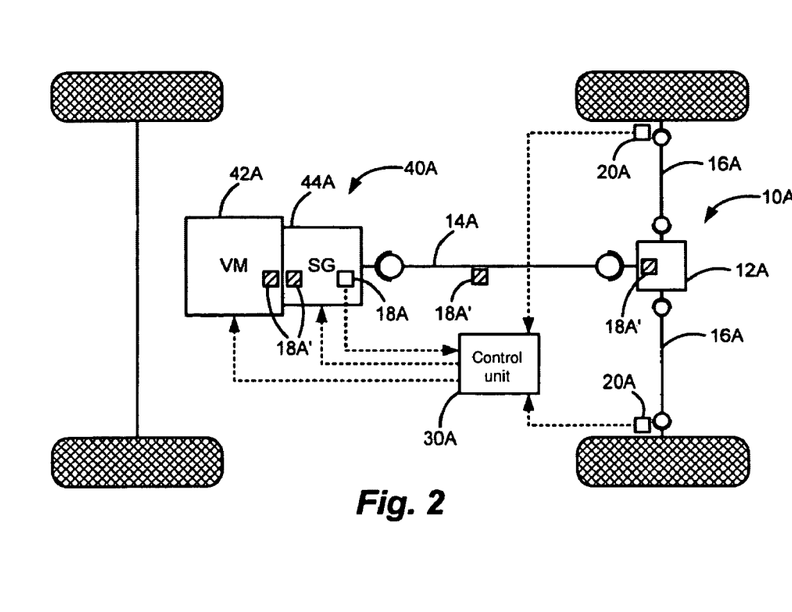
FIG. 2 is a schematic representation of a first motor vehicle drive train which transmits a torque determined with the method in accordance with the invention.
Figure 3:
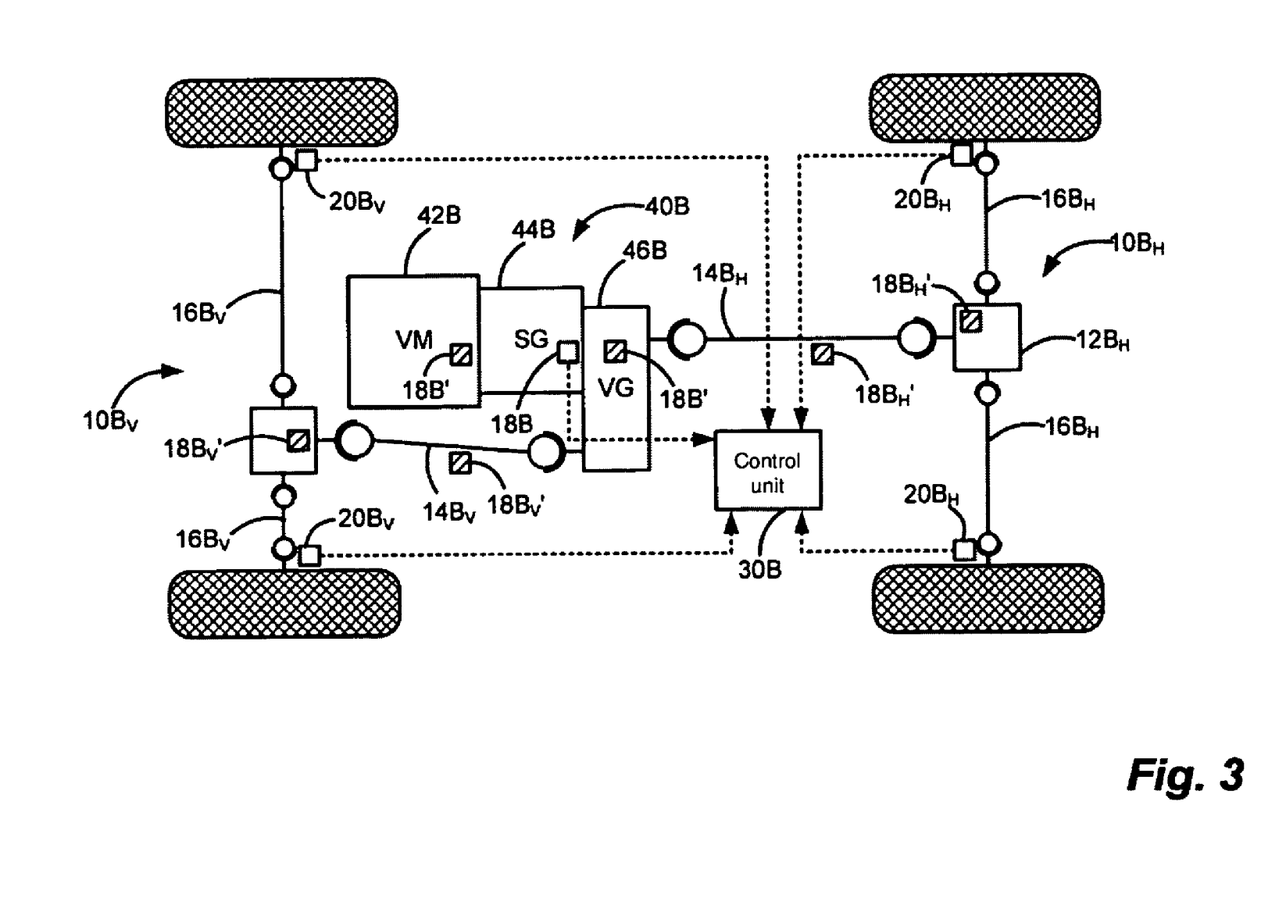
FIG. 3 is a schematic representation of a second motor vehicle drive train which transmits a torque determined with the method in accordance with the invention.
Figure 4:
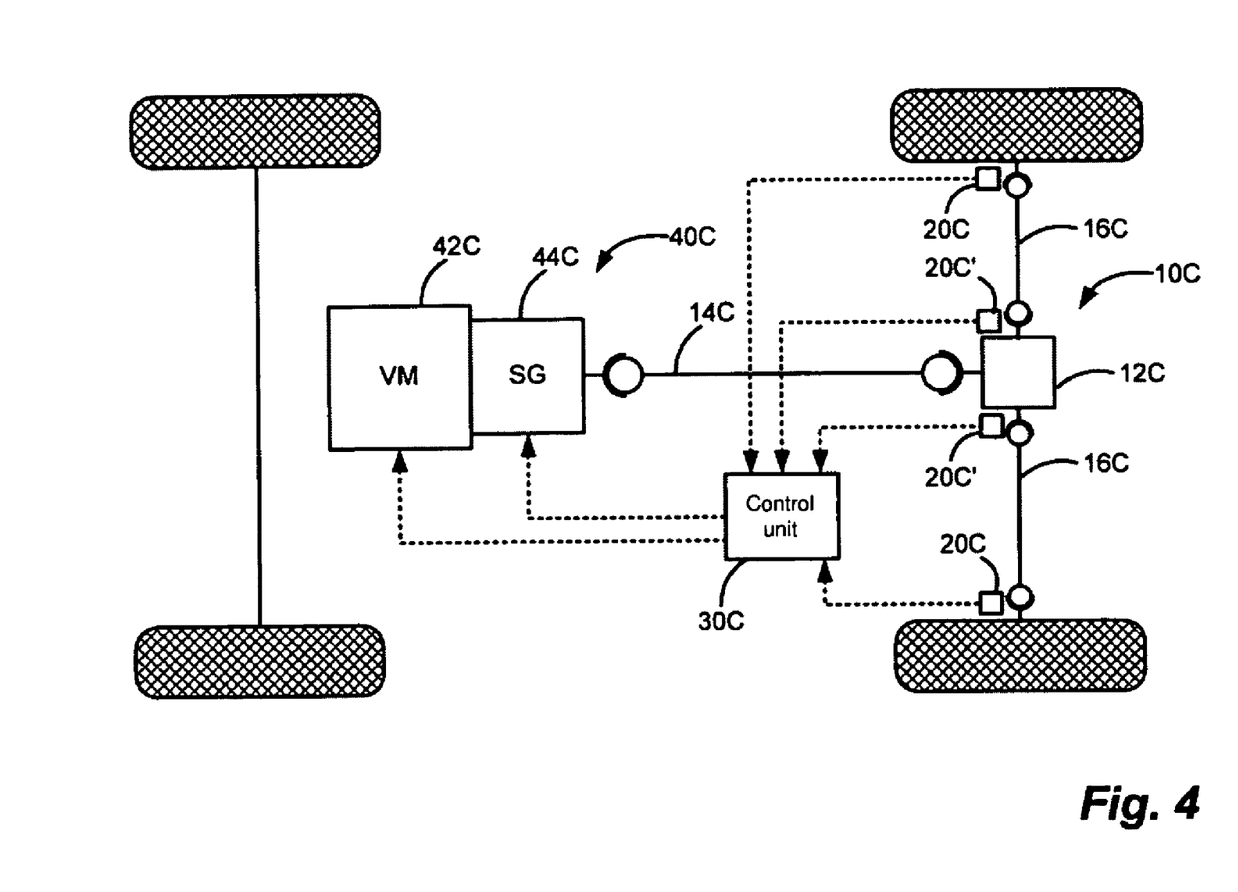
FIG. 4 is a schematic representation of a third motor vehicle drive train which transmits a torque determined with the method in accordance with the invention.

Representations of different vehicles are shown schematically in FIGS. 2 to 4. In accordance with the embodiment of FIG. 2, the torque transmission path 10A is part of a drive train 40A which includes an engine 42A (internal combustion engine) and a shift transmission 44A. The engine 42A generates a drive torque which acts on the transmission path 10A via the shift transmission 44A. The transmission path 10A includes a differential unit 12A, a cardan shaft 14A and a pair of half-shafts 16A which are connected to a respective wheel. The differential unit 12A transmits a drive torque from the cardan shaft 14A to one or both half-shaft(s) 16A. The control unit 30A determines the torque transmitted along the transmission path 10A on the basis of the signals of the speed of rotation sensors 18A, 20A in accordance with the method of the invention, as will be explained in more detail in the following.

The speed of rotation sensors 20A are arranged in the region of the respective wheel (e.g. ABS sensor). The speed of rotation sensor 18A is arranged at the longitudinal axis of the transmission path 10A in the embodiment shown. The speed of rotation sensors 18A' shown hatched each show alternative positions of the speed of rotation sensor 18A. It is not important whether the speed of rotation sensor 18A is arranged directly at the differential 12A or in the direction of the engine 42A. In automatic transmissions, automated shift transmissions or in manual transmissions, speed of rotation sensors are installed as standard at the transmission input and/or transmission output so that at least one of these sensors can be used as a speed of rotation sensor 18A or 18A'. In this case, the transmitted torque can be measured without an additional hardware effort. If a speed of rotation sensor is, however, not anyway present in the longitudinal axis, a speed of rotation sensor 18A must be provided.

Ideally, no clutches, for example a shift transmission clutch, are contained in the measurement chain. If clutches should be present within the measurement chain, it must be ensured that there is no slip during the measurement. It is a requirement for the measurement of the transmitted torque that a rigid connection occurs on the torque-induced torsion or twisting of the transmission path 10A. It must not be possible that one of the observed shafts is stationary and the other can rotate.

In FIG. 3, a schematic representation of an alternative embodiment of an all-wheel drive vehicle is shown which includes two torque transmission paths $10B_V$, $10B_H$. A transfer case 46B transfers the drive torque by means of a clutch, not shown, to a (permanently driven) rear axle transmission path 10BH and a (switchable) front axle transmission path $10B_V$. The components of the transmission paths $10B_V$, $10B_H$ substantially correspond to that of the transmission path 10A in accordance with FIG. 2. A speed of rotation sensor 18B is arranged at the longitudinal axis of the rear axle transmission path $10B_H$, for example at the output of the shift transmission 44B. Alternatively, this sensor can also be arranged at other positions along the longitudinal axis of the rear axle transmission path $10B_H$ (reference numerals 18B' and $18B_H'$ in FIG. 3). The speed of rotation sensors $20B_V$, $20B_H$ are anyway already existing sensors of the front axle or rear axle (e.g. ABS sensors) and they are located at or in the environment of the respective wheel. The control unit 30B determines at least the torque transmitted along the transmission path $10B_H$ on the basis of the signals of the speed of rotation sensors 18B, $20B_H$ in accordance with the torque determination method of the invention.

Optionally, a speed of rotation sensor $18B_V'$ is also arranged at the longitudinal branch of the front-axle transmission path $10B_V$. In this case, the control unit 30B also determines the torque transmitted along the transmission path $10B_V$ on the basis of the signals of the speed of rotation sensors $18B_V'$, $20B_V$.

In the embodiment in accordance with FIG. 4, the transmission path 10C is part of a drive train 40C which includes an engine 42C and a shift transmission 44C. The transmission path 10C includes a differential unit 12C, a cardan shaft 14C and a pair of half-shafts 16C connected to a pair of wheels. The control unit 30C determines the torque transmitted along the transmission path 10C on the basis of the signals from four speed of rotation sensors 20C, 20C', with a sensor 20C being arranged at each half-shaft 16C in the region of the respective wheel (e.g. ABS sensor) and a sensor 20C' being arranged in the region of the differential unit 12C. In this embodiment, no longitudinal axle speed of rotation sensor is used.

The present invention provides a method for the determination of a torque which is transmitted along a transmission path, for example along the above-mentioned transmission paths (10, 10A, 10B). If the vehicle is in motion, the speed of rotation sensors supply electrical pulse signals. The control unit receives these pulse signals. It counts up the pulse signals of the respective sensor from a predetermined start of a measurement continuously and calculates a respective instantaneous phase angle or an angular change from this.

For the determination of a torque transmitted along the longitudinal axis of the drive train, in a so-called three-sensor arrangement (as shown in FIGS. 2 or 3), the phase angles $\phi_L$, $\phi_R$ calculated in this manner of the two sensors (e.g. ABS sensors 20) arranged in a transverse branch of the transmission path are averaged and put into relationship with the correspondingly calculated instantaneous phase angle $\phi_K$ of the speed of rotation sensor in a longitudinal branch of the transmission path (e.g. speed of rotation sensor 18). A total phase angle $\phi_{GES}$ is calculated as an instantaneous rotary position signal relationship in accordance with the following relationship:

$$\phi_{GES} = \phi_K - (\phi_L + \phi_R)/2 \quad (1)$$

The torque $M_K$ transmitted along the transmission path is generally proportional to the instantaneously calculated total phase angle $\phi_{GES}$ (or a change thereof) and to the stiffness c of the observed part of the transmission path, that is of the part of the transmission path disposed between the sensors used. This stiffness c can be determined for the observed vehicle type by a one-time calibration measurement (e.g. by means of strain gauges). The instantaneously transmitted torque $M_K$ thus results in accordance with the following relationship:

$$M_K = c \cdot \phi_{GES} \quad (2)$$

The larger the total phase angle $\phi_{GES}$ (or a change thereof), the larger the transmitted torque $M_K$ therefore is.

The transverse torques, in particular the wheel output shaft torques $M_{QL}$, $M_{QR}$, can be calculated in a three-sensor arrangement (FIG. 2 or 3) on the basis of the torque $M_K$ transmitted in the longitudinal direction along the drive train. If a differential unit, for example the differential units 12, 12A, 12B is used with a torque distribution of 50:50 (ratio of right to left), in each case half of the torque $M_K$ transmitted in the longitudinal direction for the wheel output shaft torques $M_{QL}$ and $M_{QR}$ results in accordance with the following relationships:

$$M_{QL} = M_K/2 \quad (3a)$$

$$M_{QR} = M_K/2 \quad (3b)$$

If a differential unit is used with a constant torque distribution of, for example, 60:40 (ratio of right to left), the sum of the two transverse torques $M_{QL}$ und $M_{QR}$ again produces the longitudinal torque $M_K$ in accordance with the following relationships:

$$M_{QL} = 0.4 \cdot M_K \quad (4a)$$

$$M_{QR} = 0.6 \cdot M_K \quad (4b)$$

If a differential unit is used which can be locked 100%, different torques can result on the left and on the right wheel output shaft. As soon as the differential is 100% closed, the left or right wheel output shaft torque can be calculated in accordance with the following relationships by a comparison of the phase angle $\phi_K$ with the phase angles $\phi_L$, $\phi_R$.

$$M_{QL} = c_L \cdot (\phi_K - \phi_L) \quad (5a)$$

$$M_{QR} = c_R \cdot (\phi_K - \phi_R) \quad (5b)$$

In this connection, $c_L$ is the stiffness of the left hand torque transmission path between the sensors used and $c_R$ is the stiffness of the right hand transmission path.

One proceeds accordingly in a so-called two-sensor arrangement or four-sensor arrangement, in which two respective sensors are associated with a torque transmission path extending only in one single direction (in particular in the transverse direction, as shown in FIG. 4). For example, a total phase angle $\phi_{GES,L}$ of a left hand transverse branch of the transmission path can be calculated from the instantaneous phase angles $\phi_{L, inner}$ and $\phi_{L, outer}$ which are determined with reference to speed of rotation sensors which are located at an inner section or at an outer section respectively of the respective transmission path (e.g. sensor 20C' and 20C in accordance with FIG. 4). The total phase angle $\phi_{GES, L}$ of the left hand transverse branch is accordingly calculated in accordance with the following relationship:

$$\phi_{GES, L} = \phi_{L, inner} - \phi_{L, outer} \quad (6a)$$

Accordingly, the total phase angle $\phi_{GES, R}$ of the right hand transverse branch results from:

$$\phi_{GES, R} = \phi_{R, inner} - \phi_{R, outer} \quad (6b)$$

The torque $M_{QL}$ or $M_{QR}$ (left hand transverse branch or right hand transverse branch) transmitted along the respective transmission path is in turn proportional to the respective total phase angle $\phi_{GES, L}$ or $\phi_{GES, R}$ and of the stiffness $c_L$ or $c_R$ of the observed transverse branch of the transmission path between the sensors used:

$$M_{QL} = c_L \cdot \phi_{GES, L} \quad (7a)$$

$$M_{QR} = c_R \cdot \phi_{GES, R} \quad (7b)$$

Since measured signals only have to be delivered from the speed of rotation sensors from a specific threshold speed onward (approx. 3 kph), an absolute value or a zero point must still be determined for a specific following measurement of the transmitted torque. For this reason, at a point in time at which a known torque is transmitted along the transmission path, a first rotary position signal relationship is determined with reference to the instantaneously generated rotary position signals, said relationship serving in the following as an offset value, for example as an offset value $\phi_{offset}$ of the total phase angle or (after conversion via the stiffness c) as an offset value $M_{offset}$ of the torque. At a later point in time, a second rotary position signal relationship is determined (e.g. instantaneous total phase angle $\phi_{GES}$) is determined with reference to the instantaneously generated rotary position signals. The transmitted torque is calculated on the basis of at least the offset value and of the second determined rotary position signal relationship, in particular by a difference formation.

The determination of such an offset value can take place with reference to the rotary position signals of the speed of rotation sensors or phase angles determined at the respective point in time in accordance with the same manner of calculation as subsequently the already explained calculation of the instantaneous rotary position signal relationship, e.g. as the determination of the total phase angle $\phi_{GES}$ in accordance with the aforesaid formula (1).

The (first) rotary position signal relationship serving as the offset value can also only be taken into account indirectly, namely in that a separate (sensor-specific) offset value is associated with each speed of rotation sensor, said offset value being subtracted in each case from the subsequently generated rotary position signals (e.g. from the phase angles $\phi_K$, $\phi_L$, $\phi_R$ in accordance with equation (1)). For simplification, it is assumed in the following that the offset value is always taken into account as a single value (common to all sensors).

The determination of the offset value is particularly simple for a point in time at which it is known that no torque transmission takes place (transmission of a known torque zero). To also take account of a possible mechanical play of the transmission path with respect to the offset value (cf. the following), it is of advantage if, at the point in time of the determination of the offset value, the components of the transmission path having play contact a play abutment. The following possibilities exist in detail for this, for example: open thrust operation of a vehicle and/or cornering of an all-wheel drive vehicle with a specific minimum steering angle.

Open Thrust Operation:

On the uncoupling of the switchable axle of an all-wheel drive vehicle, for example on the complete opening of a transfer case, the wheels of this axle are pushed or pulled without any drive of their own. Due to the necessarily present bearing friction, the components of the torque transmission path associated with the switchable axis and having play are located at a play abutment. The same also applies accordingly on the opening of the clutch of the shift transmission of a vehicle having a single-axle drive and on the opening of the clutch of the shift transmission of a vehicle having all-wheel drive with an open transfer case (the wheels of both axles are then pushed or pulled). The instantaneous signals of the speed of rotation sensors can be associated with the transmission of a zero torque for such an open thrust operation for the respective uncoupled axle. It is important in this approach that the vehicle does not accelerate simultaneously, for example due to an unbraked steep downhill trip.

Cornering at a Specific Minimum Steering Angle:

In particular with an all-wheel drive vehicle, a defined condition—namely a transmitted torque zero—is also present on tight cornering (minimum steering angle e.g. >220°). On tight cornering, the front axle and the rear axle namely cover different path distances. For this reason, on such cornering, the transfer case must be opened to avoid tensions in the longitudinal direction. When the all-wheel drive vehicle is started with a steering angle, there is therefore an open thrust operation with respect to the wheels of the switchable axle.

In the aforesaid embodiments, the observed torque transmission path can—as already mentioned—include components with play (e.g. transmission, cardan joint, constant-velocity joint, connection of a shaft to another component). To determine the torque as precisely as possible from the twisting or from the relative torsion along the transmission path, the play phenomena contained therein are taken into account. The total clearance contained in the observed transmission path can be taken into account within the framework of the calculation of the transmitted torque explained above by an additional subtraction of a play value, for example by subtraction of a phase clearance value $\phi_{play}$ from the instantaneously determined total phase angle or by subtraction of a corresponding torque play value $M_{play} = c \cdot \phi_{play}$ from the determined torque value.

For the determination of the play contained in the transmission path, in a first embodiment, the play is determined for a loadless condition of the observed transmission path. A loadless condition is, for example, present on the opening of the shift transmission clutch in single-axle operation or on the opening of the clutch of a transfer case on switchable all-wheel operation in the direction of the axle to be observed. Generally, such loadless states only last a brief time (e.g. some 1/10 second up to some seconds).

In accordance with an advantageous embodiment of the invention, the respective total phase angle $\phi_{GES}$ is therefore determined for a plurality of different points in time with reference to the instantaneous sensor signals and a maximum difference between the smallest and the largest determined total phase angle $\phi_{GES}$ is determined with reference to the plurality of the thus present total phase angles $\phi_{GES}$. It is ensured by the observation of a plurality of different points in time that the total play range is detected and that in particular also both play abutments (possible maximum backplay in both rotary directions) are detected within the loadless states of the observed transmission path. The respective rotary position signal relationships of the loadless states are thus, as it were, strung together so that the total play range becomes visible (open long-term observation). The determined maximum difference $\Delta\phi_{GES}$ of the respective calculated total phase angle $\phi_{GES}$ thus corresponds to the maximum play $\phi_{play}$ which occurs.

In another embodiment, a maximum difference between the smallest and the largest determined total phase angle $\phi_{GES}$ is determined during a gear change with load reversal. The rotary position signal relationships (corresponding to a respective total phase angle $\phi_{GES}$) are therefore taken into account during a gear change in which the total play in the observed part of the drive train is worked through within a short time.

The aforesaid calculation formulae can be made more precise as follows due to the additional taking into account of the explained offset value and of the explained play value:

Total Phase Angle:

$$\phi_{GES} = (\phi_K - (\phi_L + \phi_R)/2) - \phi_{offset, GES} - \phi_{play, GES} \tag{1'}$$

$$\phi_{GES, L} = \phi_{L, inner} - \phi_{L, outer} - \phi_{offset, L} - \phi_{play, L} \tag{6a'}$$

$$\phi_{GES, R} = \phi_{R, inner} - \phi_{R, outer} - \phi_{offset, R} - \phi_{play, R} \tag{6b'}$$

Transmitted Torque:

$$M_K = (c \cdot \phi_{GES}) - M_{offset, GES} - M_{play, GES} \tag{2'}$$

$$M_{QL} = c_L \cdot (\phi_K - \phi_L) - M_{offset, QL} - M_{play, QL} \tag{5a'}$$

$$M_{QR} = c_R \cdot (\phi_K - \phi_R) - M_{offset, QR} - M_{play, QR} \tag{5b'}$$

$$M_{QL} = (c_L \cdot \phi_{GES, L}) - M_{offset, L} - M_{play, L} \tag{7a'}$$

$$M_{QR} = (c_R \cdot \phi_{GES, R}) - M_{offset, R} - M_{play, R} \tag{7b'}$$

Figure 5:
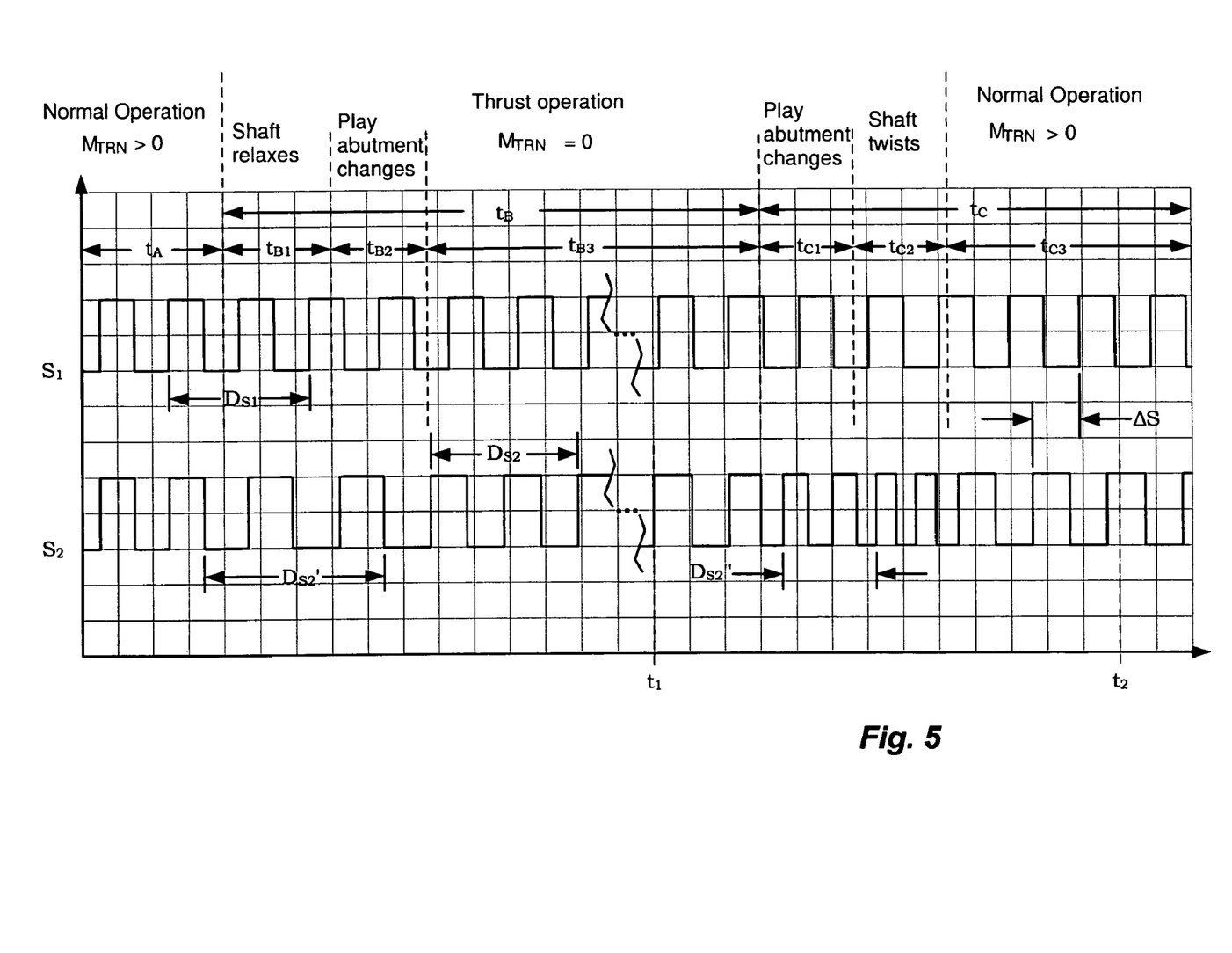
FIG. 5 is a schematic representation of signals generated by respective speed of rotation sensors.

FIG. 5 finally shows pulse signals (speed of rotation signals) of the speed of rotation sensors during an exemplary operation. The signal $S_1$ corresponds to a signal of a half-shaft sensor (e.g. sensor 20 in accordance with FIGS. 1 to 4) and the signal S2 corresponds either to a signal of a longitudinal shaft sensor (optionally multiplied by the axle reduction of the differential unit or the other transmission unit; e.g. sensor 18 in accordance with FIGS. 1 to 3) or to a signal of a second half-shaft sensor (e.g. sensor 20C' in accordance with FIG. 4).

It is assumed that the encoder wheels of the different sensors are all the same in this case and that the speed of the vehicle remains constant. The pulse interval $D_{S1}$ of the signals $S_1$ therefore normally corresponds to the pulse interval $D_{S2}$ of the signals $S_2$. The pulse signals are here shown with a much enlarged pulse interval for better clarity. It must be noted that the pulse signals of the speed of rotation sensors ultimately correspond to the already explained phase angles φ.

During the time period $t_A$, the vehicle is in a normal operation in which a torque $M_{TRN}$ larger than zero is transmitted and the observed shaft (or other component of the torque transmission path) accordingly shows torsion. At the end of the time period $t_A$, the vehicle changes into a thrust operation (time period $t_B$), with the shaft relaxing during an initial time period $t_{B1}$ and with a play being built up during a subsequent time period $t_{B2}$, i.e. starting from a first play abutment corresponding to a traction operation, the other, second play abutment of the components of the torque transmission path, which corresponds to the thrust operation, is achieved during the time period $t_{B2}$. Due to the relaxation of the shaft and to the additional build-up of the play, the pulse interval $D_{S2}$ varies briefly, for example becomes larger ($D_{S2}'$). After the relaxation of the shaft and the complete build-up of the play, the pulse interval $D_{S2}$ again corresponds to the pulse interval $D_{S1}$ and the transmitted torque $M_{TRN}$ is now equal to zero (time period $t_{B3}$).

For example, at the point in time $t_1$, the control unit starts the continuous observation of the pulse signals to calculate the torque $M_{TRN}$ transmitted at a later point in time. At the end of the time period $t_B$, the vehicle again changes to normal operation (time period $t_C$) in which a torque $M_{TRN}$ is transmitted. During an initial time period $t_{C1}$, the play is now again eliminated in the reverse direction of rotation. During a subsequent time period $t_{C2}$, the shaft bends again. During these time periods $t_{C1}$ and $t_{C2}$, the pulse interval $D_{S2}$ again varies, it in particular now reduces ($D_{S2}''$). After the elimination of the play and the bending of the shaft, the pulse interval $D_{S2}$ again corresponds to the pulse interval $DS1$ and the transmitted torque $M_{TRN}$ is larger than zero (time period $t_{C3}$). For example, at the point in time $t_2$, the control unit can calculate the instantaneously transmitted torque $M_{TRN}$ precisely on the basis of the relationship $\Delta S$ between the observed pulse signals $S_1$ and $S_2$.

For this purpose, the pulse signals $S_1$ and $S_2$ (or the corresponding phase angles φ) for the point in time $t_2$ are compared with the pulse signals $S_1$ and $S_2$ for the point in time $t_1$, for example by difference formation. In this connection, a relationship of the pulse signals $S_1$ and $S_2$ for the point in time $t_1$, at which the components of the torque transmission path contact the said second play abutment, forms an offset value as was already explained above. The total play (difference of the pulse signals solely due to the change from the second back to the first play abutment) which is also present in this connection and is determined, for example, by a long-term observation can in particular be taken into account by difference formation, as was likewise already explained.

Different further aspects of the invention will be explained in the following.

Provided that all speed of rotation sensors are connected to a single (common) control unit, the synchronization of the rotary position signals does not present any problems. The control unit 30 can, however, include sub-modules or sub-control units $30_1$, $30_2$ (FIG. 1) which receive the respective rotary position signals and which are in communication via a data bus. The control unit $30_2$ can, for example, be an already present ABS control unit, with the control unit $30_2$ transmitting communications which contain the rotary position signals to the control unit $30_1$ via the data bus. In this case, therefore, not all the speed of rotation sensors are connected to a single control unit. The clock frequencies of the involved control units $30_1$, $30_2$ can therefore be harmonized with one another or differences can be compensated. For this purpose, the respective reception point in time is determined for a large number of communications which are transmitted via the data bus to the involved control units $30_1$, $30_2$. By averaging these reception points in time, the respective (actual) clock frequency of the involved control units $30_1$, $30_2$ is determined and can be taken into account for the reception of the named communications which contain the time-critical rotary position signals.

It is also not certain that messages which are transmitted at a transmission interval of, for example, 10 ms via the data bus also all arrive at the receiver every 10 ms. The arrival interval differs depending on the bus load or, in extreme cases, a message does not reach the receiver at all. To ensure a time-synchronized processing of the signals of the speed of rotation sensors, a parameter which is proportional to the measured phase angle and a time stamp can therefore be transmitted inside a communication output by a speed of rotation sensor to the control unit which carries out the torque calculation (e.g. control unit $30_1$). The incoming phase angle information can thus be associated with the system time of the control unit $30_1$, in the control unit, so that the signals of a plurality of speed of rotation sensors can be processed synchronously in time.

The problem underlies a further aspect of the invention that acoustic problems can occur in a loadless state of a torque transmission path since vibrations can build up most easily in the loadless state. Since the loadless states can be recognized with the torque measurement of the invention, on the recognition of a loadless state, the clutch of a transfer case in the transmission path can, for example, be opened since no torque is anyway being transmitted. When the clutch is open, the acoustic transmission path is also interrupted, for example between the front axle drive train and the rear axle drive train, whereby the acoustic problems are avoided. A subsequent closing of the transmission path can be triggered, for example, by a requirement demand of a control unit.

What is claimed is:

1. A method for the determination of a torque which is transmitted along a torque transmission path which extends along at least a shaft of a motor vehicle, comprising:
producing a rotary position signal by means of a first speed of rotation sensor at a first section of the transmission path and by means of at least one second speed of rotation sensor at a second section of the transmission path,
wherein at a point in time at which a known torque is transmitted along the transmission path, a first rotary position signal relationship is determined with reference to the generated rotary position signals, said rotary position signal relationship serving as an offset value; and
at a later point in time, a second rotary position signal relationship is determined with reference to the generated rotary position signals, with the torque transmitted being calculated on the basis of at least the offset value and of the second determined rotary position signal relationship, wherein a respective rotary position signal relationship is determined for a plurality of points in time with reference to the respective generated rotary position signals, with a play value of the transmission path being determined in that a maximum difference is determined between the rotary position signal relationships determined for the plurality of points in time and in that the transmitted torque is calculated on the basis of at least the offset value of the second determined rotary position signal relationship and of the play value.

2. The method of claim 1, wherein the transmitted torque is calculated by subtraction of the offset value and of the play value from the second determined relationship of the rotary position signals.

3. The method of claim 1, wherein the play value is only determined with reference to those rotary position signals which are measured during a loadless state of the transmission path.

4. The method of claim 1, wherein the play value is determined with reference to rotary position signals which are generated at the transmission path during a load reversal caused by a gear change.

5. The method in accordance with claim 1, characterized in that the offset value is determined with reference to rotary position signals which are generated during a point in time at which a zero torque is transmitted along the transmission path.

6. The method of claim 1, wherein the offset value is determined with reference to rotary position signals which are generated during a point in time at which the parts of the transmission path having a mechanical play contact a play abutment.

7. The method of claim 1, wherein the offset value is determined with reference to rotary position signals which are produced during a point in time at which the observed transmission path is uncoupled from a drive unit of the motor vehicle.

8. The method of claim 1, wherein the offset value is determined with reference to rotary position signals which are generated during cornering of the motor vehicle.

9. The method of claim 1, wherein the offset value is determined with reference to rotary position signals which are generated during a point in time at which a driving speed of the motor vehicle exceeds a threshold value.

10. The method of claim 1, wherein a torsion angle is calculated with reference to at least the offset value and the second determined rotary position signal relationship; and in that this torsion angle is offset against a predetermined stiffness of the transmission path to calculate the transmitted torque.

11. The method of claim 1, wherein the calculated transmitted torque is compared with a threshold value, with a control command being generated in the case of the threshold value not being reached in order to interrupt an acoustic transmission path of the motor vehicle.

12. The method of claim 1, wherein the first rotary position signal relationship and the second rotary position signal relationship are determined using signals which are generated during an uninterrupted measuring operation.

13. The method of claim 1, wherein the first speed of rotation sensor is connected to a first control unit and the at least one second speed of rotation sensor is connected to a second control unit, wherein:
the respective reception point in time is determined for a plurality of communications which are transmitted via a data bus of the motor vehicle to the first control unit and to the second control unit;
the respective clock frequency of the first control unit and of the second control unit is determined by averaging the determined reception points in time;
the difference between the clock frequency of the first control unit and the clock frequency of the second control unit is determined; and
the rotary position signal relationships are determined with reference to the measured rotary position signals and additionally with reference to the determined differences in the clock frequencies.

14. The method of claim 1, wherein communications with which the rotary position signals of the speed of rotation sensors are transmitted to a control unit of the motor vehicle via a data bus are provided with an associated transmission time stamp; and in that the rotary position signal relationships are determined with reference to the measured rotary position signals and additionally with reference to the associated transmission time stamp.

15. The method of claim 1, wherein at least one of the speed of rotation sensors is additionally used for a braking force control or a driving dynamic control of the motor vehicle.

16. A method for the determination of a torque which is transmitted along a torque transmission path which extends along at least a shaft of a motor vehicle, comprising:
producing a rotary position signal by means of a first speed of rotation sensor at a first section of the transmission path and by means of at least one second speed of rotation sensor at a second section of the transmission path,
wherein at a point in time at which a known torque is transmitted along the transmission path, a first rotary position signal relationship is determined with reference to the generated rotary position signals, said rotary position signal relationship serving as an offset value; and
at a later point in time, a second rotary position signal relationship is determined with reference to the generated rotary position signals, with the torque transmitted being calculated on the basis of at least the offset value and of the second determined rotary position signal relationship, wherein the calculated transmitted torque is compared with a threshold value, with a control command being generated in the case of the threshold value not being reached in order to interrupt an acoustic transmission path of the motor vehicle.

17. A method for the determination of a torque which is transmitted along a torque transmission path which extends along at least a shaft of a motor vehicle, comprising:
producing a rotary position signal by means of a first speed of rotation sensor at a first section of the transmission path and by means of at least one second speed of rotation sensor at a second section of the transmission path,
wherein at a point in time at which a known torque is transmitted along the transmission path, a first rotary position signal relationship is determined with reference to the generated rotary position signals, said rotary position signal relationship serving as an offset value; and
at a later point in time, a second rotary position signal relationship is determined with reference to the generated rotary position signals, with the torque transmitted being calculated on the basis of at least the offset value and of the second determined rotary position signal relationship, wherein the first speed of rotation sensor is connected to a first control unit and the at least one second speed of rotation sensor is connected to a second control unit, wherein:
the respective reception point in time is determined for a plurality of communications which are transmitted via a data bus of the motor vehicle to the first control unit and to the second control unit;
the respective clock frequency of the first control unit and of the second control unit is determined by averaging the determined reception points in time;
the difference between the clock frequency of the first control unit and the clock frequency of the second control unit is determined; and the rotary position signal relationships are determined with reference to the measured rotary position signals and additionally with reference to the determined differences in the clock frequencies.

18. A method for the determination of a torque which is transmitted along a torque transmission path which extends along at least a shaft of a motor vehicle, comprising:

producing a rotary position signal by means of a first speed of rotation sensor at a first section of the transmission path and by means of at least one second speed of rotation sensor at a second section of the transmission path, wherein at a point in time at which a known torque is transmitted along the transmission path, a first rotary position signal relationship is determined with reference to the generated rotary position signals, said rotary position signal relationship serving as an offset value; and at a later point in time, a second rotary position signal relationship is determined with reference to the generated rotary position signals, with the torque transmitted being calculated on the basis of at least the offset value and of the second determined rotary position signal relationship, wherein communications with which the rotary position signals of the speed of rotation sensors are transmitted to a control unit of the motor vehicle via a data bus are provided with an associated transmission time stamp; and in that the rotary position signal relationships are determined with reference to the measured rotary position signals and additionally with reference to the associated transmission time stamp.

* * * * *